(12) United States Patent
Lindinger et al.

(10) Patent No.: US 11,054,027 B2
(45) Date of Patent: Jul. 6, 2021

(54) OPEN HYDRAULIC FLUID FLOW CIRCUIT ARRANGEMENT AND METHOD OF CONTROLLING THE HYDRAULIC CIRCUIT

(71) Applicant: Danfoss Power Solutions G.m.b.H & Co. OHG, Neumunster (DE)

(72) Inventors: Florian Lindinger, Padenstedt (DE); Sven Fink, Linden (DE)

(73) Assignee: Danfoss Power Solutions G.m.b.H & Co. OHG, Neumunster (DE)

( * ) Notice: Subject to any disclaimer, the term of this patent is extended or adjusted under 35 U.S.C. 154(b) by 0 days.

(21) Appl. No.: 15/820,675

(22) Filed: Nov. 22, 2017

(65) Prior Publication Data
US 2018/0142781 A1 May 24, 2018

(30) Foreign Application Priority Data

Nov. 22, 2016 (DE) .......................... 102016122535.5

(51) Int. Cl.
*F16H 61/40* (2010.01)
*F16H 61/4017* (2010.01)
*F16H 61/4157* (2010.01)

(52) U.S. Cl.
CPC ..... *F16H 61/4017* (2013.01); *F16H 61/4157* (2013.01)

(58) Field of Classification Search
CPC ............. F16H 61/4017; F16H 61/4148; F16H 61/4157
See application file for complete search history.

(56) References Cited

U.S. PATENT DOCUMENTS

| 2,548,147 | A | 4/1951 | Ferris |
| 9,309,645 | B2 | 4/2016 | Yamamoto et al. |
| 2003/0201668 | A1 | 10/2003 | Kim |

FOREIGN PATENT DOCUMENTS

| CN | 2071271 U | 2/1991 |
| CN | 103080551 A | 5/2013 |
| CN | 203730455 U | 7/2014 |
| CN | 105570203 A | 5/2016 |
| CN | 105980714 A | 9/2016 |
| DE | 16 27 617 B1 | 11/1971 |
| DE | 102010055716 A1 | 6/2012 |
| DE | 102011055173 A1 | 5/2013 |
| DE | 102011055174 A1 | 5/2013 |

(Continued)

OTHER PUBLICATIONS

Communication for European Patent Application No. 17 202 799.7 dated Jun. 30, 2020.

*Primary Examiner* — F Daniel Lopez
(74) *Attorney, Agent, or Firm* — McCormick, Paulding & Huber PLLC

(57) ABSTRACT

The invention relates to a fluid flow arrangement (1, 15) with an adjustable fluid pumping device (2) and a fluid working machine (12). The fluid working machine (12) is connected to the fluid pumping device (2) and a re-circulating loop is provided for the fluid working machine (12). The re-circulating loop is fluidly connecting a first fluid port (A) and a second fluid port (B) of the fluid working machine (12), where the first (A) and the second fluid port (B) are at times at a different pressure level. The re-circulating loop comprises a an adjustable fluid throttling device (21, 22), and a controllable fluid conduit device (23, 24), so that a defined decelerating force can be generated for the fluid working machine (12).

23 Claims, 5 Drawing Sheets

(56) References Cited

FOREIGN PATENT DOCUMENTS

| | | | |
|---|---|---|---|
| EP | 1 186 783 B1 | 5/2006 |
| EP | 2241529 B1 | 7/2012 |
| GB | 2 127 943 A | 4/1984 |
| WO | 2011012187 A1 | 2/2011 |

OPEN HYDRAULIC FLUID FLOW CIRCUIT ARRANGEMENT AND METHOD OF CONTROLLING THE HYDRAULIC CIRCUIT

CROSS-REFERENCE TO RELATED APPLICATION

This application claims foreign priority benefits under U.S.C. § 119 to German Patent Application No. DE102016122535.5 filed on Nov. 22, 2016, the content of which is hereby incorporated by reference in its entirety.

TECHNICAL FIELD

The invention relates to a fluid flow arrangement that comprises an adjustable fluid pumping device and a fluid working machine that is fluidly connected to the fluid pumping device and that further comprises a re-circulating loop, fluidly connecting a first fluid port and a second fluid port of the fluid working machine, where said first and said second fluid port are at times at a different pressure level. The invention also relates to an electronic controlling device for such a fluid flow arrangement (or a similar one).

BACKGROUND

Hydraulic transmissions for transferring mechanical energy from one place to the other (usually including the possibility to change some characteristics of the mechanical energy involved, like rotating speed, possible torque and the like) are used in several technical fields in the meantime. An example for this is the field of wind generators, where, due to varying wind speed, an input force, coming from the propeller and showing varying turning speed and/or driving torque has to be transmitted to an electric generator. At the electric generator, however, usually a constant turning speed is required. Therefore, not only the location where the mechanical torque is present is shifted, but also some characteristics of the mechanical energy (for example the turning speed) are translated.

Another technical field for hydraulic circuits is used for propelling vehicles, in particular land vehicles. Although already some cars or trucks are propelled using a hydraulic transmission their use is still somewhat limited, although some characteristics of hydraulic circuits are promising. However, the use of hydraulic circuits for driving a vehicle is the standard approach for special vehicles that are using hydraulics for fulfilling their main duty. Since a hydraulic pump of a considerable size is thus present already, it is quite common to use hydraulic energy for propelling the respective vehicle as some kind of a spin-off as well. Examples for such machines are forklift trucks, excavators, shovel dozers and the like.

From a technical viewpoint, closed hydraulic fluid flow circuits are preferred for propelling a vehicle due to their intrinsic properties. On the other hand, open fluid flow circuits are preferred for other devices, like hydraulic pistons, where such hydraulic pistons are used for fulfilling the main task of forklift trucks, excavators, shovel dozers and so on. Although it is of course possible from a technical viewpoint that for a machinery that needs to employ an open hydraulic fluid flow circuit, a closed hydraulic fluid flow circuit is arranged additionally, such an approach is of course disadvantageous from an economic viewpoint. Not only more components have to be foreseen and maintained for the respective machine, but also the energy efficiency drops because of the necessarily higher weight of the respective machine. Therefore, there is a desire to use a propelling arrangement in combination with an open hydraulic fluid flow circuit, albeit this is not necessarily the best starting point.

The main problem when using an open hydraulic fluid flow circuit is surprisingly not the propelling task, but instead the main problem is when it comes to braking and/or to enable a coasting of the vehicle. Here, one is not only confronted with the problem of how to generate a braking force for the combined hydraulic pump/hydraulic motor that is connected to the wheels of the vehicle, but one is also confronted with the problem of how to avoid cavitation on the suction side of the combined hydraulic pump/hydraulic motor in these modes of operation.

The situation becomes even more problematic if the vehicle has to be able to move in different directions (i.e. forward and backward) and has to be able to be slowed down in these directions as well (braking capability), which is a standard requirement.

Although some suggestions were already made in the state of the art, so far they were not necessarily satisfying.

One suggestion was to sort of "circumvent the problems" by simply providing a braking force with standard mechanical brakes and to avoid cavitation by simply continuing to supply pressurized fluid by the standard hydraulic pump. However, it is quite obvious that this is disadvantageous, not only due to the wear of the mechanical brakes, but also due to the lower energy efficiency of the vehicle.

SUMMARY

Therefore, there is a need for a fluid flow arrangement with which a vehicle can be propelled and slowed down although an open hydraulic fluid flow circuit is employed.

It is therefore the object of the invention to suggest a fluid flow arrangement that comprises an adjustable fluid pumping device and a fluid working machine that is fluidly connected to said fluid pumping device and that further comprises a re-circulating loop, fluidly connecting a first fluid port and a second fluid port of said fluid working machine, where said first and said second fluid port are preferably at times at a different pressure level that is improved over similar fluid flow arrangements that are known in the state of the art. Another object of the invention is to suggest an electronic controlling device for controlling a fluid flow arrangement that is improved over electronic controlling devices that are known in the state of the art.

The invention solves this object.

It is suggested to design a fluid flow arrangement, comprising a preferably adjustable fluid pumping device, a fluid working machine that is fluidly connected to said fluid pumping device and a re-circulating loop that is fluidly connecting a first fluid port and a second fluid port of said fluid working machine, where said first and said second fluid port of said fluid working machine are preferably at times at a different pressure level in a way that the re-circulating loop comprises an adjustable fluid throttling device and a controllable fluid conduit device. Although in principle the fluid pumping device and particularly the fluid working machine can be of a fixed type (so that one revolution of the respective machine will pump/input essentially the same fluid volume; minor variations can of course occur due to some effects like pressurization effects, viscosity effects and the like) it is preferred if at least the fluid pumping device or the fluid working machine, preferably both the fluid pumping device and the fluid working machine are of an adjustable type, so that those machines can be varied in a way that one revolution will pump/input a variable amount of fluid (within certain limits, of course). How this adjustment is done is arbitrary. In particular, fluid pumps and/or fluid working machines can be of a type were the adjustment is performed by mechanical means. As an example: wobble plate pumps/wobble plate fluid working machines are of such a mechanically adjustable type that is well known in the state of the art. However, it is also possible (and even preferred), if such fluid pumping device and/or such fluid working machine is of an electrically adjustable type. Such an electrically adjustable type is also well known in the state of the art under the name digital displacement pump® (DDP) or synthetically commutated hydraulic pump and/or motor (depending on the exact design). Fluid pumping devices and/or fluid working machines of the electrically adjustable type have the advantage that they can be varied much quicker and/or in broader ranges, both is advantageous in particular if it comes to propelling a vehicle. In a typical application of the presently suggested fluid flow arrangement, the fluid pumping device is usually of a design that it can only pump hydraulic fluid, i.e. increasing the pressure of a hydraulic fluid while consuming mechanical energy (typically applied in form of a rotation, i.e. a torque). Of course, it is also possible that the fluid pumping device is of a combined pumping/motoring design (albeit the motoring mode will usually be used only rarely, if at all). The fluid pumping device will usually be connected to a driving device, such as a combustion engine, an electric motor or the like. It is to be noted that if the fluid pumping device (and/or the fluid working machine) is of an adjustable type, it is possible that an electric motor or a combustion engine can be running at a certain, constant speed, like the speed of maximum power, the speed of maximum torque or the speed of maximum energy efficiency (where it is of course possible that a different speed regime is chosen from time to time, depending on the current operating requirements). Due to the adjustability of the fluid pumping device it is nevertheless possible to vary the amount of hydraulic fluid that is pumped by the fluid pumping device. The fluid working machine is typically of a design that it can be switched between a motoring mode and a pumping mode (where a partial motoring and pumping mode can be envisaged as well, in a way that the fluid working machine comprises different services that are fluidly separated from each other, and wherein some (at least one) of the services are operated in a motoring mode, while at the same time some (at least one) of the services are operated in a pumping mode). Additionally, the fluid working machine can be of a fixed displacement type or of a variable displacement type (where the variable displacement type typically shows some advantages with respect to controllability of the fluid flow arrangement). In the motoring mode, it is able to actively propel a vehicle, if used in this context. If the vehicle has to be decelerated, the fluid working machine will be switched to a pumping mode so that pressurized fluid will be "consumed" by other consumers, in particular by the adjustable fluid throttling device which will be elucidated later on. This way wear-free braking action can be realised. Typically, the fluid working machine will be connected to one or several devices (either directly or with any mechanical transmission system in-between (including a gear or the like)). Only for the sake of completeness, it should be mentioned that it is of course possible to use two or even more (adjustable) fluid pumping devices and/or two or more fluid working machines within the fluid flow arrangement. Depending on the mode the fluid flow arrangement is currently operated in, the first fluid port will be the high pressure port and the second fluid port will be the low pressure port, or vice versa. Typically, in case the fluid working machine is operating in a motoring mode, the high pressure port will be the fluid input port, while the low pressure port will be the fluid output port. If, however, the fluid working machine will be driven in a pumping mode, usually the high pressure port will be the fluid output port, while the low pressure port will be the fluid input port. It should be noted that from a mechanical viewpoint, the first fluid port can comprise several "mechanical fluid ports", although the various "mechanical fluid ports" from a single "logic fluid port" (the same applies mutatis mutandis to the second fluid port). Such a plurality of "mechanical fluid ports" can be connected together using a manifold or the like. However, it is also possible that the fluid working machine shows several internal fluid circuits that are separated from each other, for example for generating various pressure levels or the like. Again, for the sake of completeness it should be mentioned that the first fluid port and the second fluid port can show the same pressure level at certain times. The most obvious case for this is if the machine is shut down (for example a forklift truck that is parked overnight). With the help of the re-circulating loop the first fluid port and the second fluid port can be selectively "sort of short-circuited" at times. Thanks to this feature, a cavitation at the low pressure side can be effectively avoided. In particular, such cavitation could otherwise occur especially at the fluid input port if the fluid working machine is operated in a pumping mode (which happens if a vehicle is operated in a coasting mode or in a braking mode). Of course, this "sort of short-circuiting" should not always be present, because otherwise quite some losses of pressurized hydraulic fluid would occur if the fluid working machine is operated in a motoring mode when driving a vehicle. Then, huge energy losses would occur, or the vehicle would not be driveable anymore, at all. Furthermore, a re-circulation of fluid can be disadvantageous for other operating modes of the fluid flow arrangement, including certain braking modes, as well. A predominant example for this is the "metering mode" which will be elucidated later on. This selective switching of the re-circulating loop can be realised by the presently suggested controllable fluid conduit device. This controllable fluid conduit device can be chosen from a huge variety of devices. In particular, both active and passive controllable fluid conduit devices are possible. An active controllable fluid conduit device could be a solenoid valve, where the solenoid valve will be actuated by an electric (electronic) controller, for example. However, it is also possible that the controllable fluid conduit device is of a passive type so that no "active actuation signal" has to be generated. A possible design for such a passive controllable fluid conduit device would be a check valve or the like. Also, a combination of an active and passive controllable fluid conduit device can be used. This can be realised by a combination of two valves, like a controllable solenoid valve and passive check valve that are arranged in series. Similarly, passive controllable fluid conduit devices can be used that additionally show some kind of an active override possibility. Only for completeness, it should be mentioned that a possible design exists in a way that two directional check valves are used, while additionally and/or alternatively a single controllable on-off-type controllable fluid conduit device is placed within the re-circulating loop. It is easily understandable that the controllable fluid conduit device should be designed, arranged and/or actuated in a way that the re-circulating loop is not closed during intervals (i.e. a fluid flow throughput is not possible through the re-circulating loop), when the fluid working machine is operated in a motoring mode (or even in a pumping mode in special operating modes like a "metering mode"), while the re-circulating loop should regularly be "sort of short-circuited" during intervals when the fluid working machine is operated in a pumping mode (during coasting and/or braking of a vehicle, for example; in particular when using a "runaway prevention mode", as described later). By the notion "sort of short-circuited", usually a closed fluid loop is meant, where the "sort of" stands for a possible fluid obstruction device, where the obstruction to the fluid flow can be even considerably large. However, it should be low enough that cavitation effects for the fluid working machine can be avoided. A "sort of short-circuiting" on the "low fluid flow resistance" side (i.e. essentially fluidly short-circuiting the re-circulation loop) will essentially result in little (if at all) braking performance. This mode can nevertheless be advantageous for realising a coasting mode for a vehicle, as an example. In case the "sort of short-circuiting" is on the "high fluid flow resistance" side, a "real braking" mode for a vehicle can be realised. This is because the pressure loss over the fluid flow obstruction device (where the mechanical energy stored in the pressure level of the fluid will be converted to thermal energy) will operate as a non-wearing brake for the fluid working machine. The fluid obstruction device is realised as an adjustable fluid throttling device. The controllability of the adjustable fluid throttling device can be chosen from a wide range. In particular, it is possible that the adjustable fluid throttling device can be switched between (essentially) two modes only, namely a first mode, where essentially no fluid flow resistance will be generated (during coasting or during active propelling of a vehicle, for example), and a second mode, where a certain fluid flow resistance will be generated (for realising a "real braking mode" for a vehicle, for example). However, it is preferred if a plurality of different states, in particular a continuous range of "fluid obstruction strengths" can be realised by the adjustable fluid throttling device. This way, various braking strengths, preferably a continuous range of braking performance can be realised. Once again for the sake of completeness: a mode, where the adjustable fluid throttling device exerts essentially no fluid flow resistance on the hydraulic fluid flowing through it, is important because otherwise such a fluid flow resistance would be present during a motoring mode of the fluid working machine, as well. Otherwise, huge energy losses would occur if a vehicle is propelled, as an example. In particular, the controllability of the adjustable fluid throttling device can be realised by a throttling device that has an orifice of a variable size. However, different designs are possible as well. As an example, a device could be used where a tube of a certain diameter is employed and where the "effective" length of the tube (as seen by the circulating fluid) can be changed by "adding or removing" additional loops using switchable valves. However, other designs are possible as well.

It should be noted that even a design may be envisaged where no re-circulating loop is used anymore. Instead, one or two fluid returning fluid lines that are fluidly connecting a first fluid port and/or a second fluid port of the fluid working machine to a low-pressure fluid receiving device may be used, where at least one adjustable fluid throttling device is arranged in at least one of said fluid returning fluid lines. The fluid receiving device can be a fluid input port of a fluid pumping device or a fluid reservoir, as an example. In particular, in case a fluid reservoir is used this may be considered as a "logic re-circulating loop".

It is suggested to design the fluid flow arrangement in a way that said re-circulating loop can be circulated in opposing directions, in particular in a way that it comprises at least two adjustable fluid throttling devices and/or at least two controllable fluid conduit devices. This way, it is possible to operate the fluid working machine in opposite directions (where the fluid pumping device is normally used only in one direction; however, it might occur as well that even the fluid pumping device can be operated in alternating directions, at least at times). Using this design, a vehicle that is propelled by the presently suggested fluid flow arrangement (in particular if the wheels are mechanically connected to the fluid working machine) can be driven in different directions, i.e. in a forward direction, as well as in a rearward direction. Such a design thus yields an increased operability of the respective machinery. A fluid flow circulation in opposing directions in the re-circulating loop can be very effectively realised with the presently suggested design of at least two adjustable fluid throttling devices and/or at least two controllable fluid conduit devices. In particular, when such a design is used, the functionality of a coasting and/or braking mode can be easily realised in both driving directions of the respective vehicle. Additionally and/or alternatively however, a design of the fluid flow arrangement is possible where said re-circulating loop can be circulated in essentially only one direction, in particular in a way that it comprises a single adjustable fluid throttling device and/or a single controllable fluid conduit device within said re-circulating loop. Using this approach, the number of hydraulic components can be reduced resulting in a cheaper, less volume-consuming and/or lighter design. In case a two-directional operability is needed, this can be realised by alternative means, like a mechanical gearbox, an auxiliary motor for driving rearward, or the like. This can still be advantageous, in particular in a case where driving in a rearward direction occurs only rarely.

Another preferred embodiment of the fluid flow arrangement can be achieved if said adjustable fluid pumping device and said fluid working machine are connected using at least one fluid switching means, in particular in a way that the output of said fluid pumping device can be selectively connected to at least one of said at least two different fluid ports of said fluid working machine, in particular to one of said first and said second fluid port of said fluid working machine. Using this embodiment, it is particularly simple to realise an operation of the fluid working machine in two different directions. If used in connection with propelling a vehicle, a forward and a rearward movement of the vehicle can be easily achieved. Furthermore, using the proposed design it is particularly simple to split the fluid flow generated by the fluid pumping device and the return flow from the fluid working machine from each other, if the fluid flow arrangement is operated in a propelling mode.

It is further suggested to design the fluid flow arrangement in a way that said fluid flow arrangement is an open hydraulic fluid flow circuit. In particular, it is suggested to use the fluid flow arrangement for propelling purposes, especially for propelling land vehicles. Using the proposed design, the presently proposed fluid flow arrangement can show its intrinsic advantages and features particularly well.

Another preferred design of the fluid flow arrangement can be achieved if at least one of said adjustable fluid throttling devices is designed as a pressure relief valve with a preferably adjustable set point. As already stated above, the adjustability of the set point can be in a way that two, three, four or even more, i.e. a plurality of different discrete states can be realised. However, it is also possible (and usually preferred), if the set point can be adjusted continuously (within a certain interval). Usually, the adjustability of the set point (control of the fluid throttling device in general) is done in an automated way. How the input signal is applied is generally without relevance. As an example, the adjustment signal could be applied by mechanical means, by electrical means and/or by fluid means (pneumatics, hydraulics). Usually, an electric control signal is preferred, since such a signal can be easily generated by an electric control device (in particular an electronic controlling device). It should be stated that it is of course possible as well to apply two or even more control signals, where each individual control signal has a certain influence on the setting of the adjustable fluid throttling device/the adjustable set point. By a concurrence of the individual control signals, the "final setting"/"final set point" will be realised.

Yet another preferred design can be realised if said adjustable fluid throttling device is an electrically controllable device and/or if said controllable adjustable fluid throttling device is controlled by an electronic controlling device, in particular by a programmable electronic controlling device. As already mentioned above, the generated control signal can be a singular one. However, a plurality of control signals can act on the fluid throttling device as well. If the fluid throttling device is an electrically controllable fluid device, it is usually very easy to realise a fast and precise actuation of the adjustable fluid throttling device, resulting in the typically good controlling behaviour of the fluid flow arrangement. Furthermore, the generation of an electric control signal is typically quite easy to achieve. As proposed, the control can be performed (in part) by an electronic controlling device, in particular by a programmable electronic controlling device. A preferred design for this is an electronic microcontroller. In particular, a controlling device that is designed as a single printed circuit board device is preferred. Such devices are easily and cheaply available in the state of the art. Just to name an example, a Raspberry Pi© or an Arduino controller© are available for little money and show a remarkable computing power in the meantime. The electric control of an electrically adjustable fluid throttling device can be realised as an electric coil, generating a magnetic force on some kind of a spool or the like. Also, it is possible to use a stepper motor or an electric motor (including rotational motors as well as linear motors) to create a movement of an appropriate device. In particular, the size of an orifice could be changed within the adjustable fluid throttling device.

Yet another preferred fluid flow arrangement can be realised if at least one of said controllable fluid conduit devices is a preferably controllable directional valve, in particular a preferably controllable check valve and/or if at least one of said controllable fluid conduit devices shows a defined pressure loss behaviour over said fluid conduit device that is dependent on the fluid flow rate through said fluid conduit device. Using such a design, a reliable and cheap fluid flow arrangement can be realised. If the connection between pressure loss and fluid flow rate through the device is known, it is possible to measure (or at least to estimate sufficiently well) the fluid flow rate by performing pressure measurements. This, in turn, can be used for measuring (or at least for approximating sufficiently well) the speed of the device driven, for example, a vehicle speed. This information can also be delivered to different devices. Furthermore, such information can be used "internally" for determining the current condition of the device (for example of the vehicle) so that a more precise and more elaborate control of the overall device can be realised. Pressure sensors for this are comparatively cheap, need little building space and are quite reliable, even with respect to deteriorated hydraulic oil due to alteration effects. Furthermore, since the controllable fluid conduit device is needed anyhow and it is essentially impossible to avoid a pressure loss over it, this pressure loss can be used for a sensible purpose. In particular no additional fluid flow resistance has to be introduced for the fluid flow arrangement which result in a higher energy efficiency and generally a better performance of the fluid flow arrangement. When highlighting a "preferably controllable directional valve" and/or a "preferably controllable check valve", this can be understood as some kind of a directional valve/check valve that comprises a controllable override functionality, i.e. that it can be shut off by a control signal irrespective of the direction of the pressure difference across the valve. This can be realised by influencing the directional valve/check valve itself, or by adding another component, in particular, by adding another controlled valve that shows a controllable on-off-functionality in series.

A further preferred embodiment can be realised, if the fluid flow arrangement comprises at least one pressure measuring device, in particular a plurality of pressure measuring devices that are preferably arranged at the re-circulating loop, more preferably between a fluid port of said fluid working machine and at least one of said adjustable fluid throttling devices and/or between at least two of said adjustable fluid throttling devices and/or at the fluid output line of a preferably adjustable fluid pumping device. Using such pressure measuring devices, it is possible to gain sufficient knowledge for controlling the behaviour of the fluid flow arrangement in a sufficiently precise way. In particular, using pressure measuring devices one can obtain more information about the amount of fluid that is pumped by the fluid working machine in a coasting operation or a braking operation. As already mentioned, this information can be used for determining the speed of the devices involved, for example the vehicle speed. Using this additional input, the operation of the fluid flow arrangement, in particular of the braking behaviour of the fluid flow arrangement, can be controlled more precisely. Thus, it is even easily possible to mimic the behaviour of a standard mechanical brake or the braking behaviour of a dedicated closed hydraulic fluid flow circuit. When talking about placing (one of) the pressure measuring device(s) at the fluid output line of a preferably adjustable fluid pumping device, this should be mainly understood in a logical sense. Therefore, placing the pressure measuring device near and/or in the vicinity of the fluid working machine is of course possible (and quite often even advantageous, since due to the position near the fluid working machine the measured pressure will usually better reflect the pressure level near the fluid working machine). However, sometimes it might be advantageous as well to place the pressure measuring device (or possibly even an additional one) close to the fluid output port of the preferably adjustable fluid pumping device.

According to another aspect of the invention, it is proposed to design an electronic controlling device for controlling a fluid flow arrangement, in particular for controlling a fluid flow arrangement of the previously described design, wherein the fluid flow arrangement comprises at least one fluid working machine, at least a re-circulating loop, fluidly connecting a first fluid port and a second fluid port of a fluid working machine and at least one adjustable fluid throttling device that is arranged in said re-circulating loop in a way that said electronic controlling device generates a control signal for said at least one adjustable fluid throttling device in a way to generate a defined decelerating force for said fluid working machine. The electronic controlling device can be particularly a microprocessor and/or a single printed circuit board controller. As already mentioned, an Arduino© controller or a Raspberry Pi© could be used for this purpose. Using such an electronic controlling device it is possible to mimic the behaviour of a standard mechanical brake for a vehicle with a hydraulic circuit, in particular even with an open hydraulic fluid flow circuit. In particular, a variety of different operating modes can be easily implemented using the electronic controlling device. The electronic controlling device can be a dedicated electronic controlling device that is more or less solely used for operating the fluid flow arrangement. However, the electronic controlling device can be likewise a device that implements more functionality of the machinery, the fluid flow arrangement is used for. In this case, a sufficient amount of computing power has to be provided for fulfilling the computations, necessary for operating the fluid flow arrangement.

Additionally or alternatively, it is suggested to design an electronic controlling device for controlling a fluid flow arrangement, wherein said fluid flow arrangement comprises at least one fluid working machine, at least one fluid returning fluid line, fluidly connecting a first fluid port and/or a second fluid port of a fluid working machine to a low pressure fluid receiving device, and at least one adjustable fluid throttling device that is arranged in said at least one fluid returning fluid line in a way that said electronic controlling device generates a control signal for said at least one adjustable fluid throttling device in a way to generate a defined decelerating force for said fluid working machine. This way, similar advantages and characteristics as described above can be realised. However, such advantages and characteristics can now be realised for a different set-up of the fluid flow arrangement.

In particular, it is possible that the electronic controlling device is designed in a way that at least one sensor signal, describing the current state of the fluid flow arrangement, is used for generating said control signal. In particular, it is possible that pressure data is used for generating said control signal. Of course, other sensor signals can be used additionally and/or alternatively for generating said control signal. Pressure data can be particularly obtained from pressure measuring devices. The use of such data (with which even a fluid flow can be determined "indirectly") was previously suggested. Furthermore, not only sensor signals can be used that come from sensors that are more or less only provided for the purpose of operating the fluid flow arrangement, but instead sensor signals that come from sensors that are provided for a different purpose (for example for operating a combustion engine that drives the fluid pumping device) can be used as well. Even more, other data that is present anyhow (for example some values that come from the present electronic controlling device or from another electronic controlling device for any purpose whatsoever) can be used as an input signal as well.

It is further suggested to design the electronic controlling device in a way that said control signal is generated in a way that the fluid flow arrangement can be operated in at least one mode, taken from the group comprising: a method, in which the speed of the fluid working machine is controlled by outputting an appropriate control signal to control the pressure at an outlet port of the fluid working machine, while the fluid working machine is not driven by a fluid pumping device; a method, in which the speed of the fluid working machine is controlled by outputting an appropriate control signal to control the pressure at the outlet port of the fluid working machine, while the fluid working machine is driven, at least in part, by a fluid pumping device; and a method where the turning direction of the fluid working machine is reversed by first slowing down the speed of the fluid working machine and then switching a fluid switching means in a way that the output of a fluid pumping device is selectively connected to a different fluid port of said fluid working machine. In this context, the use of "is controlled" can be understood in the sense of "is essentially controlled", meaning that the predominant control characteristic comes from the respectively suggested control scheme. Other influences, however, may still be around, although they usually show a lesser or even a negligible effect. Using such an embodiment (or a combination thereof) a particularly versatile device can be realised. In particular, a coasting and braking operation can be realised that shows various possibly advantageous embodiments. As an example, if the fluid working machine is not driven by a fluid pumping device and the speed of the fluid working machine is controlled by outputting an appropriate control signal to control the pressure at the outlet port (i.e. where usually the control of the speed of the fluid working machine is done by setting an appropriate pressure level at the fluid outlet port of the fluid working machine, which in turn is usually done by setting an appropriate pressure difference over a fluid throttling device that is arranged aft of the fluid outlet port of the fluid working machine), a non-wearing braking system can be realised that is highly energy-efficient (no mechanical work is needed during the operation of the arrangement). If, however, the fluid working machine is controlled by outputting an appropriate control signal to control the pressure at the outlet port while the fluid working machine is driven, it is possible to determine the speed of the fluid working machine by the speed of the fluid pumping device, and hence by the combustion engine (to give an example). This might be advantageous if only a short braking impulse is needed to avoid a rapid deceleration and acceleration of the turning speed of the combustion engine, which might be a nuisance to the operator of the device. Furthermore, it might be desired by the operator to have an "audible feedback" of the driving speed by means of the turning speed of the combustion engine. It should be noted that although the fluid pumping device is kind of pumping actively, there is nevertheless only a small input of mechanical energy required for driving the fluid pumping device. This is because the fluid pumping device does not have to pump against a high pressure; so, in effect the mechanical power input reduces down to an increased mechanical friction between the components of the fluid pumping device due to the increased rotational speed. This level of increased energy input is usually acceptable. When employing a method, where the turning direction of the fluid working machine is reversed by first slowing down the speed of the fluid working machine and then switching a fluid switching means in a way that the output of a fluid pumping device is selectively connected to a different fluid port of the fluid working machine, a behaviour of the vehicle (as an example) is achievable which is very comfortable (and even safe, for example in the case of a forklift truck, where goods could fall off the fork in the case of a rapid deceleration/acceleration of the forklift truck). In particular, a very strong braking behaviour can be avoided when the reverse gear is selected, while the vehicle is still moving forward. If the fluid switching means would be operated so that the output of the fluid pumping device is connected to the respective different fluid port while the vehicle is still in motion, this would essentially unavoidably lead to the effect that a very strong braking force is applied until the vehicle comes to a complete stop. It is easily understandable that such a behaviour is not necessarily what is desired.

A further proposal is to design a fluid flow arrangement, in particular a fluid flow arrangement according to the previous description in a way that it shows an electronic controlling device according to the previous description.

Yet another advantageous embodiment can be obtained, if the fluid flow arrangement is used as a propelling means for a vehicle, in particular for a land vehicle. In this case, the fluid flow arrangement can show its intrinsic advantages and features particularly well.

BRIEF DESCRIPTION OF THE DRAWINGS

Further advantages, features, and objects of the invention will be apparent from the following detailed description of the invention in conjunction with the associated drawings, wherein the drawings show.

DETAILED DESCRIPTION

Figure 1:
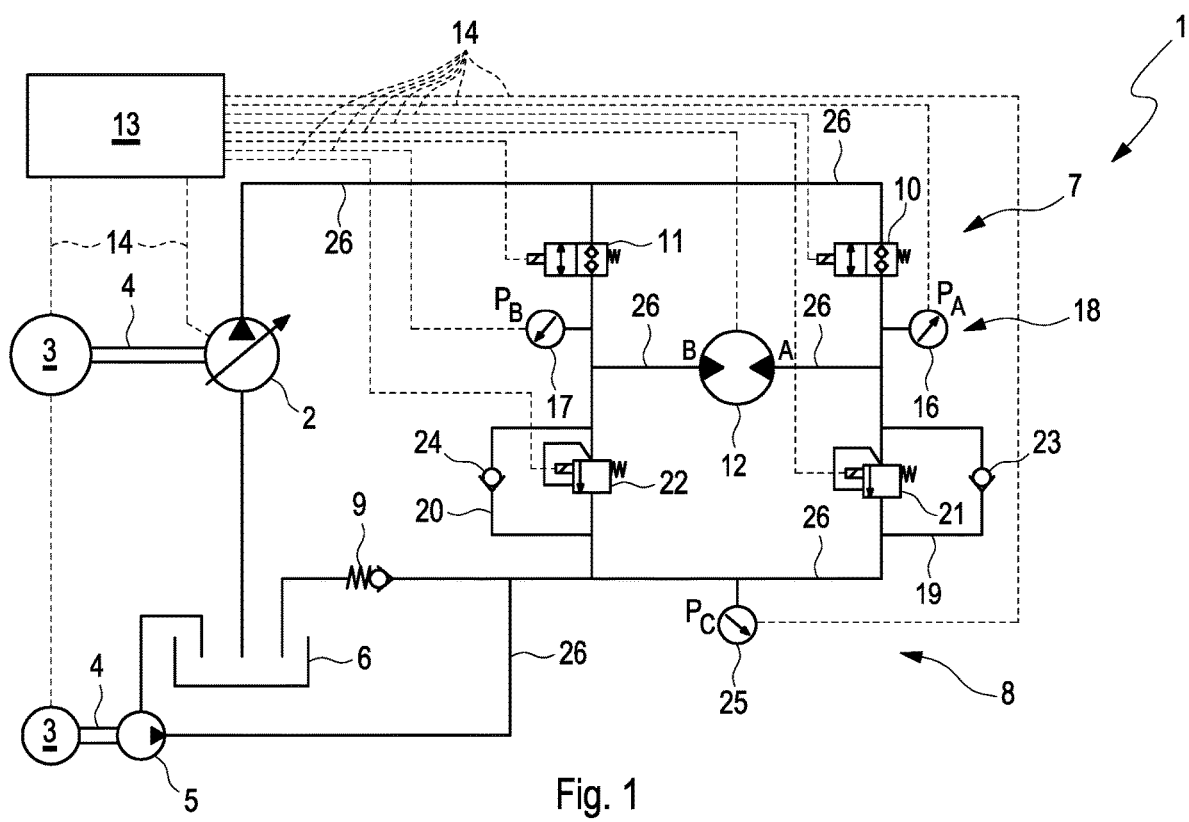
FIG. 1: the schematic circuitry of a first embodiment of a hydraulic propelling circuit, employing an open hydraulic fluid flow circuit.

The invention relates to a fluid flow arrangement (1, 15) with an adjustable fluid pumping device (2) and a fluid working machine (12). The fluid working machine (12) is connected to the fluid pumping device (2) and a re-circulating loop is provided for the fluid working machine (12). The re-circulating loop is fluidly connecting a first fluid port (A) and a second fluid port (B) of the fluid working machine (12), where the first (A) and the second fluid port (B) are at times at a different pressure level. The re-circulating loop (26a) comprises an adjustable fluid throttling device (21, 22), and a controllable fluid conduit device (23, 24), so that a defined decelerating force can be generated for the fluid working machine (12).

In FIG. 1, a first embodiment of a hydraulic propelling circuit 1 that can be used for moving a vehicle (in particular a vehicle that uses a hydraulic system anyhow, for example a forklift truck, a shovel loader, an excavator or the like) is shown as a fluid flow schematic. The presently shown hydraulic propelling circuit 1 is set up in a way that the vehicle can be moved in two different (opposing) directions, i.e. in a forward and in a backward direction. Since the schematic is set up in a symmetric way, the propelling characteristics (maximum speed, torque etc.) are essentially identical in both directions. This is actually a preferred behaviour for machinery such as excavators or forklift trucks. Furthermore, it can be seen that the hydraulic propelling circuit 1 is of an open hydraulic fluid flow circuit type.

In "reality", the output of the main hydraulic pump 2 could be used for different purposes as well, like for hydraulic pistons for raising the fork of a forklift truck, for moving the shovel of a shovel loader or the like. Of course, it is also possible that a dedicated pump for such "other hydraulic services" is used (or presumably a main hydraulic pump 2 is used that comprises different independent services, where different services are used for different hydraulic sub-circuits).

The main hydraulic pump 2 is driven by a driving engine, which is presently designed as a combustion engine 3 (for example a diesel motor or a natural gas motor). The torque that is generated by the combustion engine 3 is transmitted by a driving shaft 4 to the main hydraulic pump 2.

As can be seen as well, an auxiliary hydraulic pump 5 is provided. The auxiliary hydraulic pump 5 pumps hydraulic fluid from an oil reservoir 6 (typically at ambient pressure) to the low pressure side 8 of the hydraulic propelling circuit 1. Furthermore, the auxiliary hydraulic pump 5 can additionally serve as a source of fluid for other tasks/devices (presently not shown). In particular, throttling valves can be used to provide different pressure levels for such additional tasks/devices and/or for the elevated pressure in the low pressure side 8 of the hydraulic propelling circuit 1, in particular in case a single auxiliary hydraulic pump 5 is used.

Both the main hydraulic pump 2 and the auxiliary hydraulic pump 5 (or possibly other additional hydraulic pumps that are not shown, as well) take in hydraulic oil from the fluid reservoir 6.

A minimum pressure is guaranteed by means of the auxiliary hydraulic pump 5, so that the respective fluid lines 26 do not run dry. On the other hand, the pressure within the low pressure side 8 of the hydraulic propelling circuit 1 is limited to a comparatively low pressure by means of a low pressure relief valve 9, that can be designed as a (slightly) pre-loaded check valve (where the preloading can be realised by a helical spring or the like) as it is well known in the state of the art.

With "realistic set-ups", the same combustion engine 3 is used for both the main hydraulic pump 2 and auxiliary hydraulic pump 5 (typically, both hydraulic pumps 2, 5 are connected to the main driving shaft 4). While it is possible that two separate hydraulic pumps 2, 5 are used, the hydraulic pumps 2, 5 can also be of a "type separated by employing different services", i.e. they can be designed as several independent services of common pump housing.

In the presently shown example, the auxiliary hydraulic pump 5 is of a fixed displacement type (where the pumping rate of the auxiliary hydraulic pump 5 is rather limited; the pressure the auxiliary hydraulic pump 5 has to be able to reach is rather limited as well, since only a pressure level that is typical for the low pressure side 8 of the hydraulic propelling circuit 1 has to be reached or (slightly) exceeded).

The main hydraulic pump 2 is of an adjustable type, for example a variable displacement hydraulic pump type (a wobble plate pump, for example). Another (typically preferred) design of the adjustable main hydraulic pump 2, and that is chosen for the presently shown embodiment, is a so-called digital displacement pump (DDP®), that is also known as a synthetically commutated hydraulic pump in the state of the art.

The pressurized fluid that is pressurized by the main hydraulic pump 2 is fed to the high pressure side 7 of the hydraulic propelling circuit 1. Using an appropriate switching of the switchable fluid valves 10, 11 (both of an on-off-type), the pressurized fluid can be fed to either port "A" (via fluid valve 10) or to fluid port "B" (via fluid valve 11) of the fluid working machine 12. The fluid working machine 12 is a combined fluid motor/fluid pump. It can be of a purely mechanical nature, or it can be controlled by appropriate controlling signals and/or can send sensor signals to an electronic controller 13 via electric signal lines 14. The electronic controller 13 is not only connected to the fluid working machine 12 by means of electric signal lines 14, but also other components of the hydraulic propelling circuit 1 are connected to the electronic controller 13 by means of electric signal lines 14 for obtaining control signals and/or for feeding sensor signals (or other feedback signals) to the electronic controller 13. In particular, the already described combustion engine 3, main hydraulic pump 2, fluid valves 10, 11 and fluid working machine 12 are connected to the electronic controller 13.

As can be seen from the schematic as well, pressure sensors 16, 17 are fluidly connected to appropriate fluid lines 26 for monitoring the pressure in the respective part of the hydraulic propelling circuit 1. The pressure values that are measured by the respective pressure sensors 16, 17 are fed to the electronic controller 13. Namely, pressure sensor 16 is located aft of fluid valve 10 in the vicinity of Port "A" of the fluid working machine 12, while pressure sensor 17 is located aft of fluid valve 11 in the vicinity of Port "B" of the fluid working machine 12.

The middle part 18 of the hydraulic propelling circuit 1 (where the fluid working machine 12 is located) is connected to the low pressure side 8 by means of a valve combination 19, 20 that is arranged either on the "A" side (right side) or the "B" side (left side) of the hydraulic propelling circuit 1. Namely, the valve combination 19 on the right side comprises an adjustable fluid throttling device 21, such as an adjustable pressure relief valve 21 that allows a fluid flow from middle part 18 to low pressure side 8 of the hydraulic propelling circuit 1, in case an appropriate pressure difference is present. The cracking pressure of adjustable pressure relief valve 21 can be adjusted by electronic controller 13 by applying an appropriate actuation signal via the appropriate electrical signal line 14. Thus, the pressure difference between pressure sensor 16 (hydraulic pressure in the middle part 18 in the proximity of Port "A" of the fluid working machine 12) and pressure sensor 25 (hydraulic pressure in the low pressure side 8 of hydraulic propelling circuit 1) can be set to a defined value (of course, typically only if the pressure at pressure sensor 16 is higher than the pressure at pressure sensor 25).

If the pressure difference reverses (i.e. pressure at pressure sensor 25 is higher than pressure at pressure sensor 16) a controllable fluid conduit device 23, such as a check valve 23 opens and a fluid flow is permitted from the low pressure side 8 to the middle part 18 of the hydraulic propelling circuit 1.

The valve combination 20 of the arrangement on the "left side" of the hydraulic propelling circuit 1 (near port "B" of the fluid working machine 12) is done in a similar way as on the "right side". In particular, the valve combination 20 comprises an adjustable fluid throttling device 22, such as an adjustable pressure relief valve 22 and a controllable fluid conduit device 24, such as a check valve 24 whose operation and functionality is similar to the valve combination 19 on the "right side" and detailed description is omitted for brevity.

Of course, the pressure level on the low pressure side 8 of the hydraulic propelling circuit 1 that is measured by pressure sensor 25 is fed to the electronic controller 13 by an appropriate electric signal line 14 as well.

Figure 9:
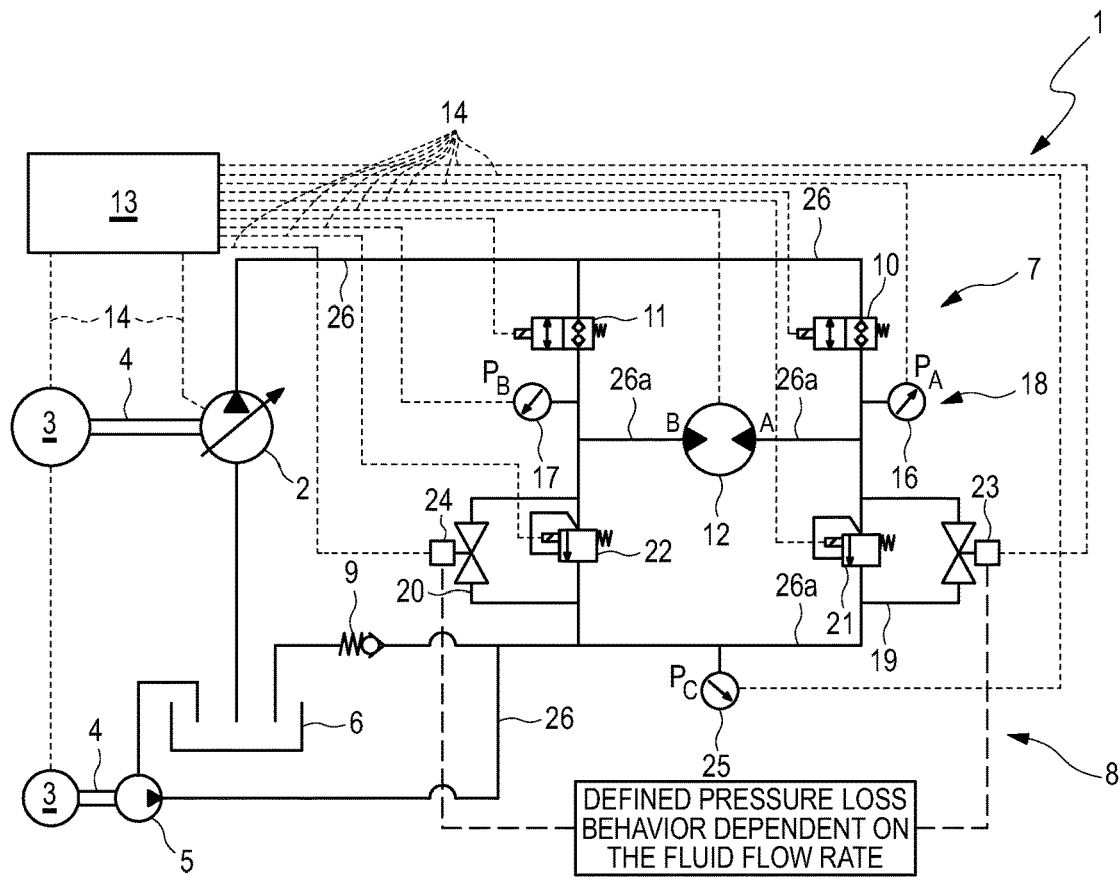
FIG. 9 is the schematic circuitry of an alternative embodiment of the first embodiment of a hydraulic propelling circuit, employing an open hydraulic fluid flow circuit.

In FIG. 9, an alternative embodiment of the first embodiment of a hydraulic propelling circuit 1 is shown as a fluid flow schematic. The FIG. 9 embodiment includes controllable fluid conduit devices 23, 24 instead of the check valves 23, 24 of the first embodiment of FIG. 1.

Figure 2:
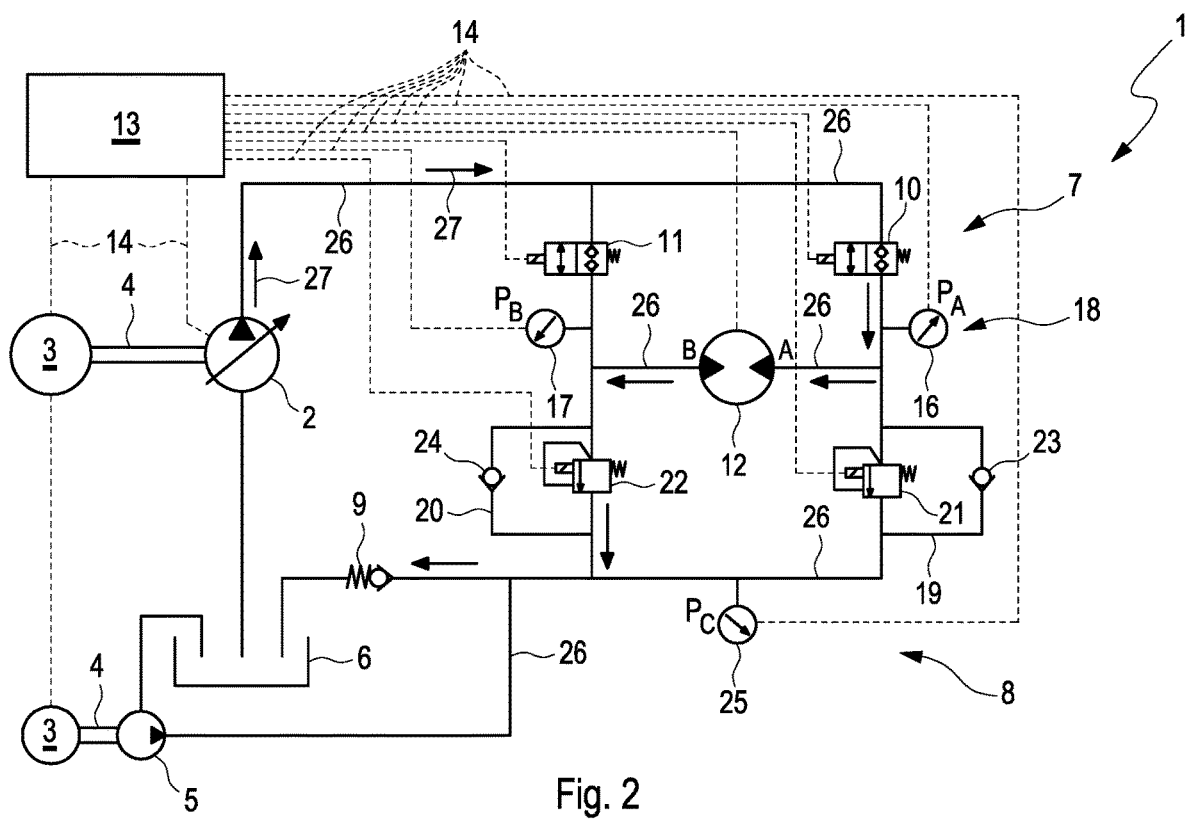
FIG. 2: the first embodiment of a hydraulic propelling circuit in a driving mode.

In FIG. 2, a "standard driving situation" of the hydraulic propelling circuit 1 is shown. In particular, the direction of the fluid flow is indicated by arrows 27 near the respective hydraulic fluid line 26. In the presently shown example, the fluid working machine 12 is rotating in one direction (for example a forward direction of a forklift truck, if the hydraulic propelling circuit 1 is used for such a forklift truck). If the moving direction of the fluid working machine 12 (and thence of the forklift truck) has to be reversed, the fluid flow will be changed by establishing a fluid flow in a way that essentially the left side ("B") and the right side ("A") of the hydraulic propelling circuit 1 near fluid working machine 12 are interchanged.

In the "standard driving mode", hydraulic fluid is sucked in from the fluid reservoir 6 by the main hydraulic pump 2, pressurized and ejected toward the high pressure side 7 of the hydraulic propelling circuit 1. The fluid valves 10, 11 are switched in a way that a fluid connection is established between high pressure side 7 and Port "A" of fluid working machine 12 in the middle part 18 of hydraulic propelling circuit 1. The fluid connection between the high pressure side 7 and the side of the middle part 18 near fluid port "B" of the fluid working machine 12, however, is disconnected. Therefore, fluid valve 10 is switched "on" (permitting a fluid flow there through), while fluid valve 11 is "off" (no fluid flow permitted through the valve).

Since no braking performance is needed, the adjustable pressure relief valve 22 of the valve combination 20 on the "left side" ("B"-side) is set to a mode that the pressure difference across the valve is 0 (apart from unavoidable residual effects). In effect, setting the pressure difference to essentially 0 is advantageous from an energetic viewpoint, since any pressure difference over adjustable pressure relief valve 22 would result in a fluid obstruction resulting in reduced energy efficiency of the system.

Of course, to avoid some kind of "short-circuiting", the adjustable pressure relief valve 21 of the valve combination 19 on the "right side" ("A"-side) is set to its maximum value, so that as a consequence any fluid flow through adjustable pressure relief valve 21 is hindered (apart from the possibility of any "emergency depressurization" due to a defect of the arrangement).

As can be seen by the appropriate arrows 27 near the hydraulic fluid lines 26, the hydraulic fluid is therefore directed via fluid valve 10 (right side), through the fluid working machine 12 (direction port "A"→"B"), adjustable pressure relief valve 22 (left side), low pressure relief valve 9 back to the fluid reservoir 6.

Therefore, mechanical energy that comes from the combustion engine 3 is converted to pressurization energy by the main hydraulic pump 2, which is converted back to mechanical energy at the fluid working machine 12 (operating as a hydraulic motor in this mode of operation).

This will result in a positive torque which accelerates the fluid working machine 12 and the attached load (for example for propelling a vehicle).

Apart from small amounts of a leakage in the hydraulic propelling circuit 1 and its components, the hydraulic fluid flow across the fluid working machine 12 can be assumed to be identical to the hydraulic fluid flow through the main hydraulic pump 2. Hence, with a known displacement of the fluid working machine 12, the speed of the fluid working machine 12 (and hence of the load, for example the speed of a vehicle) can be controlled by controlling the fluid output flow of the main hydraulic pump 2.

Figure 3:
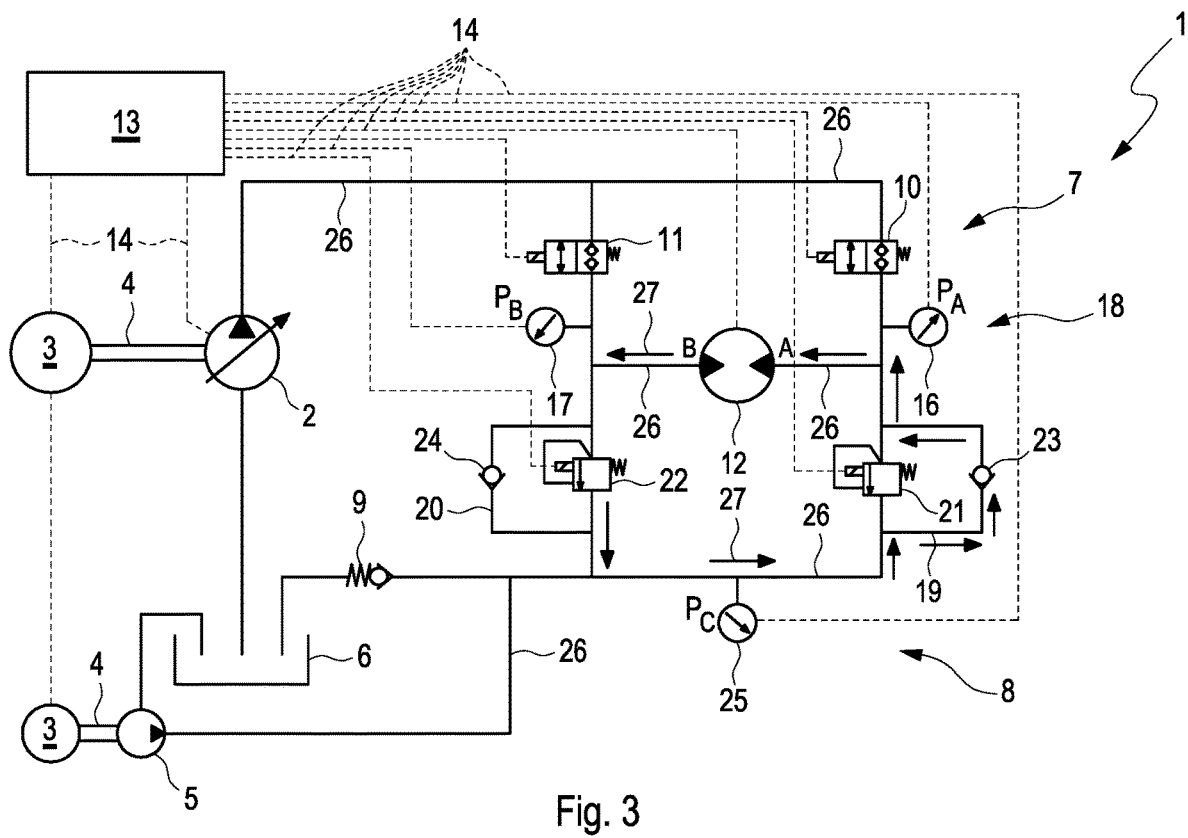
FIG. 3: the first embodiment of a hydraulic propelling circuit in a runaway prevention mode, in which the turning speed of the driving engine is independent from the turning speed of the fluid working machine.

Now, if the amount of fluid that is pumped by the main hydraulic pump 2 is reduced to (approximately) 0, the fluid flow behaviour according to FIG. 3 will be established.

Due to the switching-off of main hydraulic pump 2, no fluid flow is delivered to the fluid working machine 12 (by the main hydraulic pump 2) anymore. In effect, fluid valve 10 could be switched off as well.

Now the problem would arise that cavitation occurs in part of the "A"-side of the hydraulic propelling circuit 1. Such a cavitation has to be avoided, since it could seriously damage the respective components, in particular the fluid working machine 12. Therefore, the hydraulic propelling circuit 1 is designed in a way that a fluid back flow to port "A" of the fluid working machine 12 is possible. Please note that right at the moment the (actuated) fluid valves 10, 11 and/or the adjustable pressure relief valves 21 and 22 are still at the setting according to the situation shown in FIG. 2.

In consequence, a "short-circuited" fluid flow is established in a fluid re-circulating loop 26a, starting from port "B" (the fluid output port of fluid working machine 12, which now works as a hydraulic fluid pump) through "left" adjustable pressure relief valve 22 (pressure difference set to 0), through "right" check valve 23 (pressure difference across the check valve 23 is 0 as well) and back to port "A" (fluid intake port) of the fluid working machine 12.

Now, obviously, the connection between the turning speed of the combustion engine 3 and/or the main hydraulic pump 2 and the turning speed of the fluid working machine 12 is lost. In particular, the combustion engine 3 and/or the main hydraulic pump 2 could be idling, while the fluid working machine 12 is still running at an elevated speed (in case the hydraulic propelling circuit 1 is used for propelling a vehicle, the vehicle would still move).

This situation can be voluntarily (desired mode of operation), as in the case of idling the main hydraulic pump 2 while coasting the fluid working machine 12 (coasting a vehicle). However, the situation could also be involuntarily, as in the case of "running away" downhill of a vehicle.

Now, some kind of a braking capability has to be implemented. This is done by setting the "left" adjustable pressure relief valve 22 to a certain pressure differential that corresponds to a certain, desired braking behaviour ("runaway prevention mode"). Typically, the "right" adjustable pressure relief valve 21 will remain at a setting (will be set to a setting) of a maximum pressure difference (effectively, a switched off-condition).

From a controlling side, the situation according to FIG. 3 ("runaway prevention mode") can be identified by the electronic controller 13 by the first condition that $P_B > P_A$ (pressure $P_B$=pressure at "left" pressure sensor 17; "B"-side, while pressure $P_A$=pressure at the "right" pressure sensor 16 at the "A"-side). This can be easily understood because the pressure at the "A"-port of the fluid working machine 12 drops to 0 (hopefully not below 0 because of possible cavitation), while due to the pumping behaviour of the fluid working machine 12, the "B"-port will be at a certain pressure level (because there will always be some pressure due to fluid obstructions and fluid viscosity).

Another condition for detecting the situation according to FIG. 3 is the absence of a fluid flow (fluid flux) through the main hydraulic pump 2 ($Q_{MHP}$=0). This can be seen by the actuating signal to the main hydraulic pump 2.

To establish a defined braking behaviour for the hydraulic propelling circuit 1 ("runaway prevention mode"), "left" adjustable pressure relief valve 22 has to be set to a certain point, so that the pressure at fluid port "B" of the fluid working machine 12 reaches a certain point. Then, the fluid working machine 12 has to work against a pressure difference $P_B - P_A$, so that the fluid working machine 12 has to perform some mechanical work against the difference in pressure level; which is equivalent to a braking power performed on the fluid working machine 12 (and possibly the vehicle's movement, if employed for this use).

Figure 4:
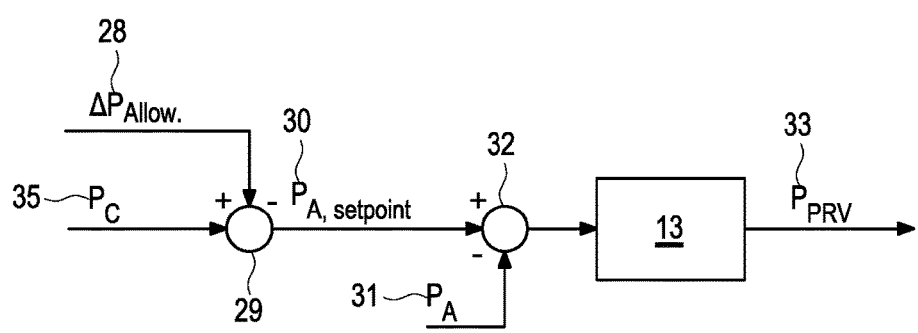
FIG. 4: a possible control schematic for implementing a runaway prevention mode.

A possible control schematic for this is shown in FIG. 4.

The input value $P_C - \Delta P_{maximum\ allowable}$ 28 is the allowable pressure difference over "right" check valve 23. Since the check valve 23 (likewise the "other check valve" 24) is chosen in a way that the connection between the fluid flow through the respective valve and the pressure difference occurring between both sides of the valve is known, it is possible to determine from this pressure difference over the valve the fluid flow through the valve (at least in good approximation). This, however, is an indication of the vehicle's speed (if the hydraulic propelling circuit 1 is used for propelling a vehicle).

This value is fed (at the negative input line) to a comparator 29, where it is compared with the measured pressure $P_C$ at pressure sensor 25 that is connected to the low pressure side 8 of the hydraulic propelling system 1 (and which is fed into the positive input line of comparator 29). The output of the comparator 29 is a value $P_{A,\ set\ point}$ 30, namely the "theoretical value" of pressure $P_A$, how it should be. This is compared to the real value of $P_A$ 31 (measured value), i.e. the value that is actually measured by "right" pressure sensor 16. This is done by feeding the respective values into another comparator 32, whose output signal is one of the input signals for the electronic controller 13. The electronic controller 13 finally calculates the value $P_{PRV}$ 33, which is the pressure set point for the pressure relief valve, currently the "left" pressure relief valve 22. This again is the "main input value" determining the braking performance of the arrangement.

This way, a wear-free brake can be realised in a simple and efficient way.

Only for completeness it should be noted that a mechanical brake should still be provided for safety reasons, of course.

Figure 5:
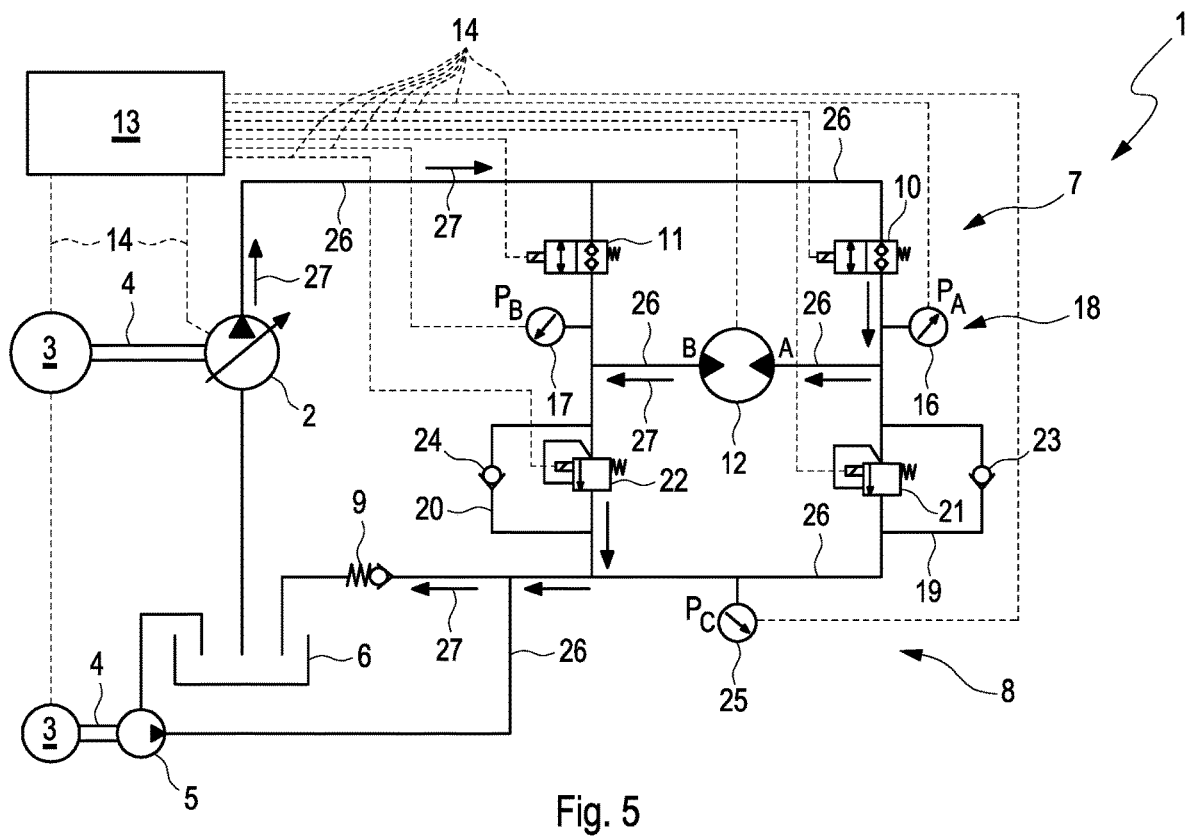
FIG. 5: the first embodiment of a hydraulic propelling circuit in a metering mode, in which a braking is effectuated wherein the turning speed of the fluid working machine depends on the turning speed of the driving engine.

Another mode that can be realised with the present arrangement (being different from the previously described "runaway prevention mode") is the so-called "metering mode" that is indicated in FIG. 5. Again, the setting of the fluid valves 10, 11 and pressure relief valves 21, 22 is initially done in the same way as it is done in FIG. 2.

Now, however, the idea is to realise a braking performance of the hydraulic propelling circuit 1, while maintaining a direct connection between the turning speed of the main hydraulic pump 2 (and hence of the combustion engine 3 due to the mechanical connection by driving shaft 4). Hence, the control of the vehicle's speed is done through an appropriate setting of the adjustable main hydraulic pump 2.

The condition when "metering" can be used (and how it can be identified) is in one respect identical to the previously described "runaway prevention mode", namely in that $P_B > P_A$ (fluid working machine 12 is operating as a fluid pump, thus performing mechanical work against the pressure difference and thus slowing down the vehicle). Different to the "runaway prevention mode" as previously described, the fluid flow rate of the main hydraulic pump 2 is different from 0 (QMHP≠0).

In order to establish the direct correspondence between fluid flow through the fluid working machine 12 (and hence rotational speed of the fluid working machine 12) and the fluid flow, generated by the main hydraulic pump 2, the pressure upstream of the fluid working machine 12 (which is the pressure at pressure port "A", i.e. $P_A$) must be maintained at a sufficiently high level to not only avoid cavitation, but also to avoid re-circulating fluid flow, presently through "right" check valve 23. This translates to the requirement for pressure $P_A$ upstream of the fluid working machine 12 to be higher than the pressure $P_C$ in the low pressure side 8 (measured by pressure sensor 25), i.e. higher than $P_C$. ("Right" adjustable pressure relief valve 21 is kept at a "closed" condition, i.e. at maximum pressure difference setting).

Although not necessarily required, the check valves 23, 24 may be designed in a way that they can be actively closed by a control signal, irrespective of the pressure difference across the respective valve. This can be utilised as some kind of an "override functionality". Such a functionality can be realised by placing a controllable solenoid valve in series with a check valve. Other designs are possible as well, however.

Figure 6:
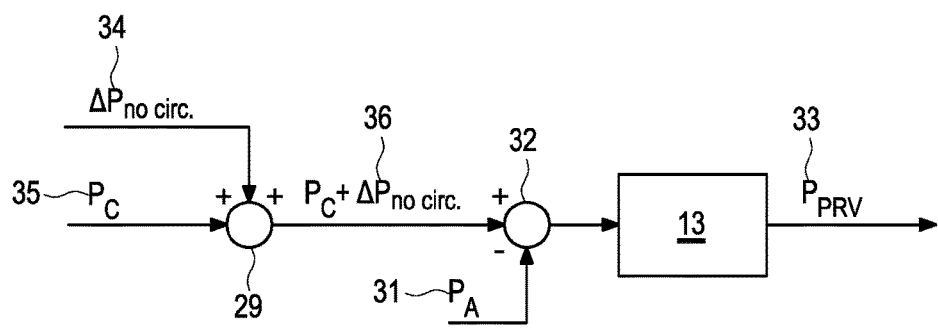
FIG. 6: a possible control schematic for implementing a metering mode.

An appropriate control scheme schematic for this is shown in FIG. 6. Now one of the input values of first comparator 29 is changed to $\Delta P_{no\ circulation}$ 34, i.e. to a setting so that pressure $P_A$ near inlet port "A" of the fluid working machine 12 is maintained at a level that is higher than $P_C$ in the low pressure side 8 of the hydraulic propelling circuit 1. This is compared to $P_C$ 35, as measured by pressure sensor 25. Contrary to the previous case, however, comparator 29 uses both values 34, 35 as a positive input signal. The output 36 of first comparator 29 is now $P_C + \Delta P_{no\ circulation}$ as a set point. This is compared as in the previous case with measured value of $P_A$ 31, as measured by presently "right" pressure sensor 16 by comparator 32. This is the input signal for electronic controller 13, which calculates as an output signal the pressure set point $P_{PRV}$ 33 for the presently "left" pressure relief valve 22 (therefore, the set point for this pressure relief valve will change from the initial "0-setting").

Although in the examples of FIGS. 2, 3 and FIG. 5 a (let's say) forward motion of the vehicle was shown, it is obvious how to realise a backward motion by sort of interchanging the fluid flow between the left side and the right side of fluid working machine 12 and the respective hydraulic fluid lines 26 serving fluid ports A and B.

For completeness, it should be mentioned that in case that only a "metering mode" is used for braking purposes (as described in connection with FIG. 5), and no "runaway prevention mode" is needed (as described in connection with FIG. 3), it is possible to dispense with the fluid re-circulating loop 26a and even with the check valves 23, 24. Instead, the fluid output ports of the pressure relief valves 21, 22 can be simply connected to the fluid reservoir 6 by means of fluid returning fluid lines/fluid return lines.

Figure 7:
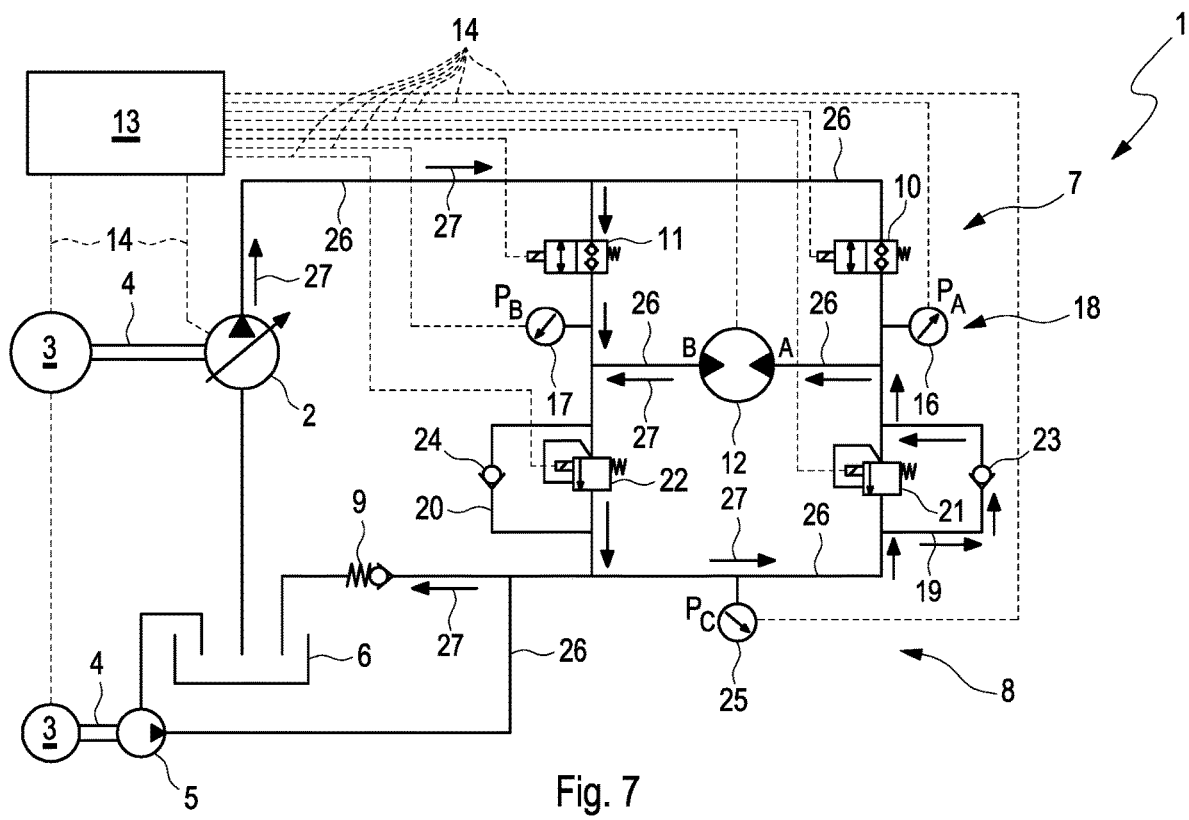
FIG. 7: the first embodiment of a hydraulic propelling circuit in an ingressive reversal mode that is to be avoided.

Nevertheless, a potential problem that still has to be discussed is a problem that occurs if the hydraulic propelling circuit 1 is switched to a backward moving mode, while the vehicle is still moving forward (or vice versa). This is the problem of "aggressive reversal" which is shown in FIG. 7.

If switching "normally" from a forward to a backward mode of the fluid working machine 12, this would mean that "right" fluid valve 10 would be switched from "on" to "off", while "left" fluid valve 11 would be switched from "off" to "on". Furthermore, the initial settings for the adjustable pressure relief valves 21, 22 would be realised, namely a setting that "right" adjustable pressure relief valve 21 would be set to 0-pressure difference (from "max"), while "left" pressure relief valve 22 would be set to maximum pressure difference setting (from a 0-pressure difference; essentially to a shut-off of the respective valve with the exception of the "emergency function" if the maximum allowable pressure is exceeded). As it is easily understandable, in particular the setting of "left" adjustable pressure relief valve 22 will lead to a maximum braking power of the hydraulic propelling circuit 1. This would result in an at least uncomfortable behaviour of the vehicle; quite often even in a dangerous behaviour, since in the case of a forklift truck, heavy goods might fall off the fork, resulting in a damage or destruction of the goods and possibly even in injuries or fatalities of a person standing nearby. This, of course, is to be avoided.

The idea for solving this problem is to program the electronic controller 13 in a way that in case a reversal of direction is commanded, the electronic controller 13 will at first switch to either "runaway prevention mode" according to FIG. 3, or to "metering mode" according to FIG. 5 and perform a braking action. As soon as a complete stop is detected (which can be determined by an equality of pressures $P_A$ and $P_B$ at the fluid ports "A" and "B" of fluid working machine 12), the "runaway prevention mode" or the "metering mode" will be stopped and the "standard driving mode" as shown and described with respect to FIG. 2 will be established (in the opposite direction). This way, a smooth transition can be made. In particular, it is possible to use a moderate braking power for the "slowing down phase" before a reversal of movement is established.

Of course, it should be mentioned that (some of) the pressure sensors 16, 17, 25 can be arranged at a different position and/or that some additional pressure sensors can be provided in the hydraulic propelling circuit 1 as well. In such a case, the control schematic has to be adapted appropriately (in particular some variations from the embodiment of a control schematic as shown in FIG. 4 and/or in FIG. 6 have to be employed).

The decision on whether the vehicle has sufficiently slowed down (speed approximately zero), so that a rearward driving mode may be engaged, can be made by use of an external speed sensor, or by intrinsic calculations, based on pressure differences and known pressure behaviour of a/some of the hydraulic device(s) involved, in particular of fluid valves. This possibility is not restricted to the presently described embodiment.

Figure 8:
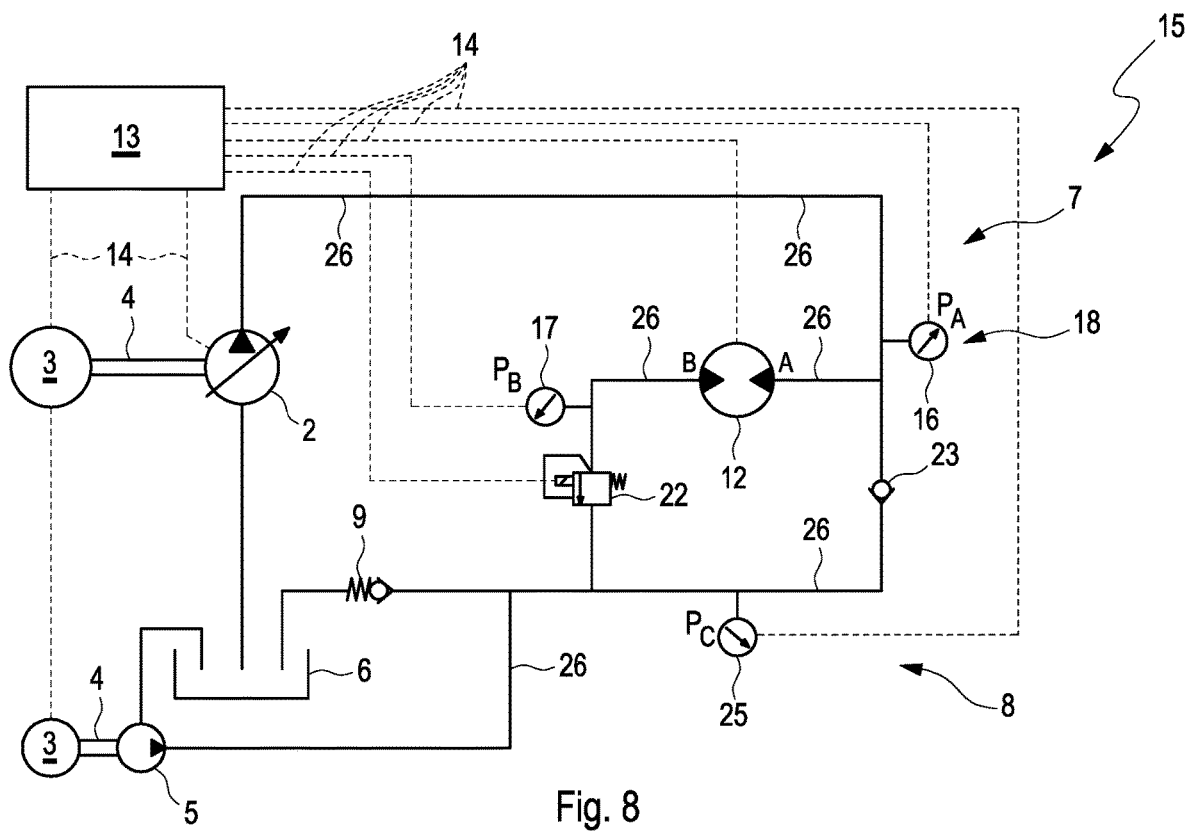
FIG. 8: the schematic circuitry a second embodiment of a hydraulic propelling circuit.

Finally, with respect to FIG. 8, a second embodiment of a hydraulic propelling circuit 15 is shown as fluid flow schematic. Contrary to the previously described embodiment, which enables reversal of motion, the presently shown embodiment of a hydraulic propelling circuit 15 can only be used in one direction (a backward movement has to be realised by some other devices, if needed). As an example, a mechanical gearbox could be introduced between fluid working machine 12 and the wheels, or a small electric helper motor could be used for realising a backward movement. The presently shown embodiment might prove to be useful if no backward movement is needed at all, or if a backward movement is used only rarely, so that some additional components with very small dimensions can be used for such a backward movement. This could be the case for a normal car, where a backward movement is used only rarely.

Figure 10:
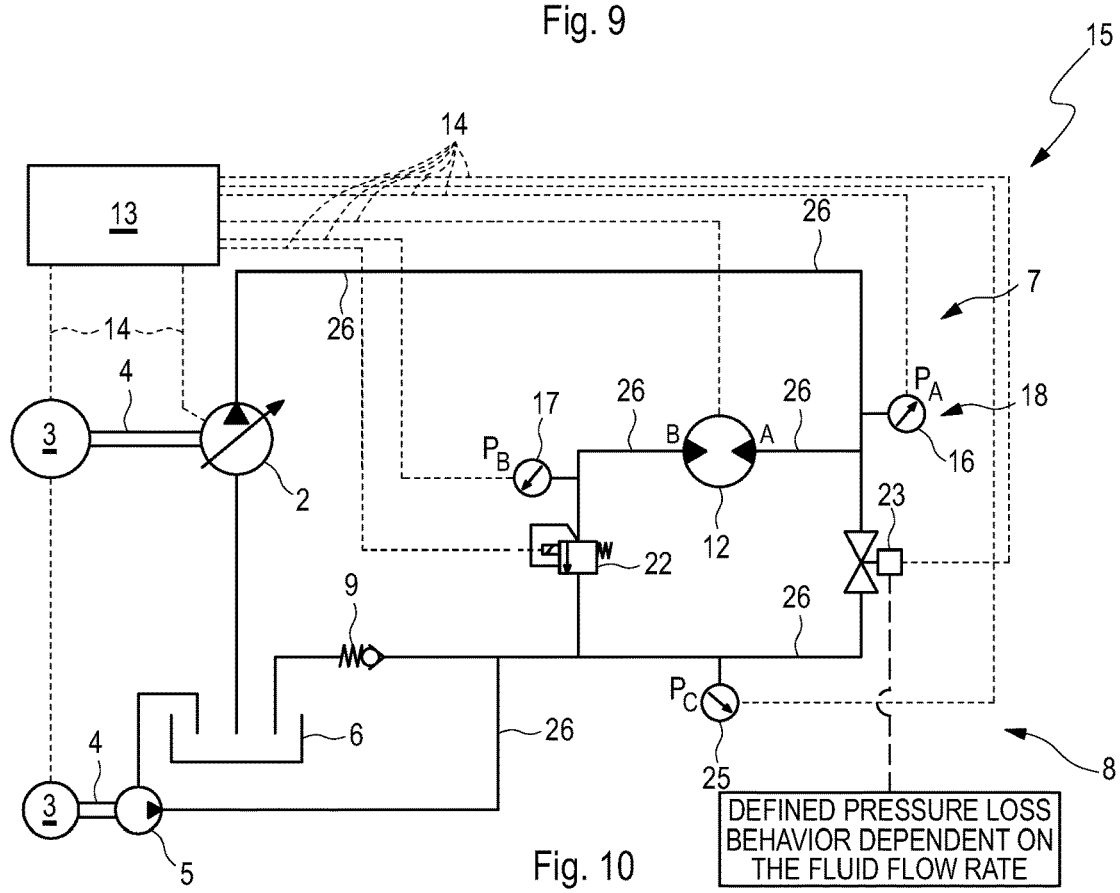
FIG. 10 is the schematic circuitry of an alternative embodiment of the second embodiment of a hydraulic propelling circuit.

In FIG. 10, an alternative embodiment of the second embodiment of a hydraulic propelling circuit 15 is shown as a fluid flow schematic. The FIG. 10 embodiment includes a controllable fluid conduit device 23 instead of the check valves 23 of the second embodiment of FIG. 8.

As can be seen from the circuitry scheme, no switchable fluid valves are needed anymore between the high pressure side 7 and the middle part 18. On the contrary, a simple hydraulic fluid line 26 between main hydraulic pump 2 and fluid working machine 12 is sufficient. Nevertheless, all three pressure sensors 16, 17, 25 are still used.

Between middle part 18 and low pressure side 8 of the hydraulic propelling circuit 15, only one pressure relief valve 22, namely the former "left" pressure relief valve 22 is used, while on the "right side" only a check valve 23, namely the former "right" check valve 23 is used. The other former "right" pressure relief valve 21 and the former "left" check valve 24 can be omitted, however.

As can be seen, all of the normal driving mode, runaway prevention mode and metering mode can be realised with a simplified circuitry according to the second embodiment of a hydraulic propelling circuit 15, if only one direction of movement has to be realised. It is understandable, that due to the reduced amount of components needed, this hydraulic propelling circuit 15 is cheaper to implement.

Due to the close similarity of both embodiments of a hydraulic propelling circuit 1, 15, similar reference numbers have been used for similar parts. This does not mean that in real embodiments, the respective components had to be exactly the same.

In particular in the presently described embodiment according to FIG. 8, a sufficient supply of hydraulic oil at the fluid input port A of fluid working machine 12 during coasting (or breaking) in a way so that no cavitation occurs, can be realised as well by moving the "right" check valve 23 in parallel to the main hydraulic pump 2 (with an appropriate opening direction of the check valve). Of course, an additional check valve "on top of right check valve 23" can be used as well at the position of the main hydraulic pump 2.

The same idea can be applied mutatis mutandis to the first embodiment of a hydraulic propelling circuit 1 as shown and described with reference to FIGS. 1 to 7 (and likewise to other embodiments as well).

Further, it should be mentioned that in particular if the second embodiment of a hydraulic propelling circuit 15 according to FIG. 8 is only to be used in a driving mode and a "metering mode" (and thus not in a "runaway prevention mode"), a fluid re-circulating loop 26a (including the check valve 23) is not necessary anymore and can thus be omitted. Then, the fluid output port of pressure relief valve 22 can be simply fluidly connected to the fluid reservoir 6 by means of a fluid return line.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A fluid flow arrangement, comprising an adjustable fluid pumping device, a fluid working machine fluidly connected to said fluid pumping device, and a re-circulating loop for fluidly connecting a first fluid port and a second fluid port of said fluid working machine, where said first and said second fluid ports are at times at a different pressure level,
wherein the re-circulating loop comprises a fluid throttling device and a fluid conduit device,
wherein the fluid throttling device is configured to throttle fluid while the fluid is re-circulating in the re-circulating loop, and
wherein the fluid conduit valve has a defined pressure loss behavior over the fluid conduit valve that is dependent on the fluid flow rate through the fluid conduit valve, and
further comprising one or more pressure measuring devices arranged to measure a pressure loss over the fluid conduit valve.

2. The fluid flow arrangement according to claim 1, wherein said adjustable fluid pumping device and said fluid working machine are connected using at least one fluid switching means, in a way that the output of said fluid pumping device can be selectively connected to at least one of said first and said second fluid ports of said fluid working machine.

3. The fluid flow arrangement according to claim 1, wherein said fluid flow arrangement is an open hydraulic fluid flow circuit, for propelling purposes.

4. The fluid flow arrangement according to claim 1, wherein the fluid throttling device is a pressure relief valve with an adjustable set point.

5. The fluid flow arrangement according to claim 4, wherein said fluid throttling device is an electrically controllable device and/or in that said fluid throttling device is controlled by an electronic controlling device.

6. The fluid flow arrangement according to claim 1, wherein one of the pressure measuring devices is arranged between said first fluid port of said fluid working machine and said fluid conduit valve and another of the pressure measuring devices is arranged between said controllable fluid throttling device and said fluid conduit valve.

7. The fluid flow arrangement according to claim 1, further comprising an electronic controlling device operatively connected to the fluid throttling device, wherein the electronic controlling device is configured to control the fluid throttling device to throttle the fluid while the fluid is re-circulating in the re-circulating loop.

8. The fluid flow arrangement according to claim 1, wherein the fluid is re-circulating in the re-circulating loop when
the fluid flows from the first fluid port, then through the fluid working machine, then to the second fluid port, then to the fluid throttling device, then to the fluid conduit valve, and then to the first fluid port.

9. The fluid flow arrangement according to claim 1,
wherein at least one pressure measuring device is arranged at the re-circulating loop between the fluid throttling and the fluid conduit valve to measure a loop pressure ($P_c$);
wherein said loop pressure ($P_c$) and a maximum allowable pressure loss over said fluid conduit device are fed into a first comparator to determine a theoretical pressure; and
wherein said theoretical pressure and a pressure measured at one of said first and second fluid ports are fed into a second comparator to determine a difference and to provide a signal to a controller based on that difference.

10. The fluid flow arrangement according to claim 1, wherein a minimum pressure, which is greater than atmospheric pressure, is maintained in the re-circulation loop between the fluid throttling device and the fluid conduit valve by means of an auxiliary hydraulic pump.

11. The fluid flow arrangement according to claim 1, wherein the fluid throttling device is located downstream of the first fluid port, wherein fluid flows through the fluid throttling device during a propelling operation mode, and wherein fluid flows through the fluid throttling device during a re-circulation mode.

12. The fluid flow arrangement according to claim 1, wherein the fluid throttling device is located downstream of the first fluid port, wherein fluid flows through the fluid throttling device during a propelling operation mode, and wherein fluid flows through the fluid throttling device during a braking operation mode.

13. The fluid flow arrangement according to claim 1, further comprising an electronic controlling device operatively connected to the fluid throttling device, wherein the electronic controlling device is configured to control the fluid throttling device to throttle the fluid while the fluid is re-circulating in the re-circulating loop;
and further comprising a first pressure measuring device arranged between a fluid port of the fluid working machine and the fluid conduit valve and a second pressure measuring device arranged between the fluid throttling device and the fluid conduit valve, wherein the electronic controlling device is configured to receive signals from the first and second pressure measuring devices; and
wherein the control of the fluid throttling device to throttle the fluid while the fluid is re-circulating in the re-circulating loop is a function, at least in part, of the signals received from the first and second pressure measuring devices.

14. The fluid flow arrangement according to claim 1, further comprising an electronic controlling device operatively connected to the fluid conduit device, wherein the electronic controlling device is configured to control the fluid conduit device to open or close the re-circulation loop.

15. The fluid flow arrangement according to claim 1, further comprising an electronic controlling device configured to generate a control signal for the fluid throttling device that results in a defined decelerating force for the fluid working machine being generated.

16. The fluid flow arrangement according to claim 1, further comprising an electronic controlling device configured to determine a pressure set point of the fluid throttling device based on pressure measurements from the measured pressure loss over the fluid conduit device.

17. An electronic controlling device configured for controlling a fluid flow arrangement having an adjustable fluid pumping device, a fluid working machine fluidly connected to the fluid pumping device, and a re-circulating loop for fluidly connecting a first fluid port and a second fluid port of the fluid working machine, where the first and the second fluid ports are at times at a different pressure level, wherein a fluid throttling device and a fluid conduit device are included in the re-circulating loop, wherein the fluid throttling device is configured to throttle fluid while the fluid is re-circulating in the re-circulating loop, wherein the fluid conduit device has a known defined pressure loss behavior over the fluid conduit device that is dependent on the fluid flow rate through the fluid conduit device, and a pressure loss over the fluid conduit device is measured,
said electronic controlling device configured to:
receive a signal corresponding to the measured pressure loss over the fluid conduit device, and
generate a control signal for the fluid throttling device that generates a defined decelerating force for the fluid working machine while fluid is circulating in the re-circulation loop.

18. The electronic controlling device according to claim 17, wherein said fluid flow arrangement comprises at least one fluid returning fluid line for fluidly connecting one of said first fluid port and said second fluid port of fluid working machine to a low pressure fluid receiving device, wherein the fluid throttling device is arranged in said at least one fluid returning fluid line, and wherein said electronic controlling device generates a control signal for said fluid throttling device in a way to generate a defined decelerating force for said fluid working machine while fluid is flowing in the fluid returning fluid line to the low pressure fluid receiving device.

19. The electronic controlling device according to claim 17, wherein at least one sensor signal, describing the current state of the fluid flow arrangement, is used for generating said control signal, in that said at least one sensor signal comprises pressure data used for generating said control signal.

20. The electronic controlling device according to claim 17, wherein said control signal is generated in a way that the fluid flow arrangement can be selectively operated in a first mode in which the speed of the fluid working machine is controlled by outputting an appropriate control signal to control an outlet pressure at the first fluid port or the second fluid port of the fluid working machine while the fluid working machine is not driven by the fluid pumping device; a second mode in which the speed of the fluid working machine is controlled by outputting an appropriate control signal to control the outlet pressure at the first fluid port or the second fluid port of the fluid working machine while the fluid working machine is driven, at least in part, by the fluid pumping device; and a third mode where the turning direction of the fluid working machine is reversed by first slowing down the speed of the fluid working machine and then switching a fluid switching means in a way that the output of the fluid pumping device is selectively connected to the other fluid port of the first fluid port or the second fluid port of the fluid working machine.

21. The electronic controlling device according to claim 17, wherein the electronic controlling device is configured to determine a pressure set point of the fluid throttling device based on pressure measurements from said measured pressure loss over said fluid conduit device and from one of said first and second fluid ports.

22. A fluid flow arrangement comprising an adjustable fluid pumping device, a fluid working machine fluidly connected to said fluid pumping device, a re-circulating loop for fluidly connecting a first fluid port and a second fluid port of said fluid working machine, and an electronic controlling device, where said first and said second fluid ports are at times at a different pressure level, wherein the re-circulating loop comprises a fluid throttling device and a fluid conduit device from which a defined pressure loss behavior over said fluid conduit device that is dependent on the fluid flow rate through said fluid conduit device is known and a pressure loss over said fluid conduit device is measured, and
wherein said electronic controlling device generates a control signal for said fluid throttling device based on said defined pressure loss behavior and said measured pressure loss in a way to generate a defined decelerating force for said fluid working machine.

23. The fluid flow arrangement according to claim 22 that is used as a propelling means for a vehicle.

* * * * *